US010067487B2

(12) United States Patent
Tierce

(10) Patent No.: US 10,067,487 B2
(45) Date of Patent: Sep. 4, 2018

(54) ELECTRONIC DEVICE AND SYSTEM FOR CONTROLLING APPLICATIONS IMPLEMENTING AT LEAST ONE PIEZOELECTRIC, ELECTROSTRICTIVE OR MAGNETOSTRICTIVE TRANSDUCER

(71) Applicant: SINAPTEC, Lezennes (FR)

(72) Inventor: Pascal Tierce, Genech (FR)

(73) Assignee: SINAPTEC, Lezennes (FR)

( * ) Notice: Subject to any disclaimer, the term of this patent is extended or adjusted under 35 U.S.C. 154(b) by 1031 days.

(21) Appl. No.: 14/364,043

(22) PCT Filed: Dec. 6, 2012

(86) PCT No.: PCT/FR2012/052823
§ 371 (c)(1),
(2) Date: Jun. 9, 2014

(87) PCT Pub. No.: WO2013/083925
PCT Pub. Date: Jun. 13, 2013

(65) Prior Publication Data
US 2014/0336823 A1    Nov. 13, 2014

(30) Foreign Application Priority Data

Dec. 9, 2011  (FR) .................................... 11 61371

(51) Int. Cl.
*G05B 15/02*    (2006.01)
*B06B 1/02*     (2006.01)

(52) U.S. Cl.
CPC ............ *G05B 15/02* (2013.01); *B06B 1/0207* (2013.01)

(58) Field of Classification Search
None
See application file for complete search history.

(56) References Cited

U.S. PATENT DOCUMENTS 5,406,503 A    4/1995 Williams, Jr. et al.
6,437,480 B1   8/2002 Saya
(Continued)

FOREIGN PATENT DOCUMENTS

EP    1199047 A2    4/2002
EP    1216760 A2    6/2002
(Continued)

OTHER PUBLICATIONS

English Translation of the International Preliminary Report on Patentability (Chapter I), dated Jun. 10, 2014, incorporating the English Translation of the Written Opinion of the International Search Authority for PCT/FR2012/052823, ISA/EP, dated Feb. 20, 2013, previously submitted in French language with Applicant's Information Disclosure Statement filed Jun. 9, 2014 (8 pages).

(Continued)

*Primary Examiner* — Ronald D Hartman, Jr.
(74) *Attorney, Agent, or Firm* — Harness, Dickey & Pierce, P.L.C.

(57) ABSTRACT

An electronic device for controlling applications using at least one piezoelectric, electrostrictive, or magnetostrictive transducer. The device includes an electric power generator, electronic control means capable of automatically controlling the electric power generator by using a control macro-function, and an electronic memory. Stored in the memory are the following: a first family of control functions including one or more different elementary control functions, each elementary control function of the first family making it possible to adjust the amplitude of the control signal; a second family of control functions including one or more different elementary control functions, each elementary control function of the second family making it possible to adjust the duration of the control signal; and a third family of control functions including several different elementary (Continued)

control functions, each elementary control function of the third family making it possible to adjust the cycle of the control signal.

18 Claims, 5 Drawing Sheets

(56) References Cited

U.S. PATENT DOCUMENTS

| | | | |
|---|---|---|---|
| 6,469,957 B1 | 10/2002 | Savord et al. | |
| 7,154,209 B2* | 12/2006 | Fujinawa | H02N 2/062 310/317 |
| 7,476,233 B1 | 1/2009 | Wiener et al. | |
| 7,901,400 B2* | 3/2011 | Wham | A61B 18/1442 606/34 |
| 8,253,370 B2* | 8/2012 | Araki | H02N 2/142 318/799 |
| 8,798,950 B2* | 8/2014 | Nikolic | B06B 1/0253 310/317 |
| 2005/0033201 A1* | 2/2005 | Takahashi | A61B 17/320068 601/2 |
| 2007/0163349 A1 | 7/2007 | Johansen et al. | |
| 2007/0183605 A1* | 8/2007 | Yoshino | H04R 3/12 381/59 |
| 2008/0108901 A1* | 5/2008 | Baba | A61B 8/0833 600/459 |
| 2011/0184445 A1* | 7/2011 | Smith | A61B 17/320092 606/169 |
| 2012/0123458 A1* | 5/2012 | Giordano | A61B 5/0538 606/169 |

FOREIGN PATENT DOCUMENTS

| | | |
|---|---|---|
| EP | 1588671 A1 | 10/2005 |
| EP | 1835622 A2 | 9/2007 |

OTHER PUBLICATIONS

International Search Report and Written Opinion of the ISA for PCT/FR2012/052823, ISA/EP, Rijswijk, NL, dated Feb. 20, 2013.
French Search Report and Written Opinion for priority document FR1161371, dated Oct. 19, 2012.
European Search Report and Written Opinion for parallel application EP 12 30 6532, dated Feb. 8, 2013, EPO, Munich.
Murimi, E. et al., "A Survey of Ultrasonic Waves in Powder Transportation," Proceedings of the 2011 Mechanical Engineering Conference on Sustainable Research and Innovation, vol. 3, May 5-6, 2011, pp. 155-159, 2011.

* cited by examiner

ELECTRONIC DEVICE AND SYSTEM FOR CONTROLLING APPLICATIONS IMPLEMENTING AT LEAST ONE PIEZOELECTRIC, ELECTROSTRICTIVE OR MAGNETOSTRICTIVE TRANSDUCER

CROSS-REFERENCE TO RELATED APPLICATIONS

This application is a 371 U.S. National Stage of International Application No. PCT/FR2012/052823, filed Dec. 6, 2012. This application claims priority to French Application No. 1161371, filed Dec. 9, 2011. The disclosures of the above applications are incorporated herein by reference.

TECHNICAL FIELD

The present invention relates to the field of the control, using an electric power generator, of applications implementing at least one piezoelectric, electrostrictive or magnetostrictive transducer, and in particular, but not exclusively, an ultrasonic transducer.

PRIOR ART

Many industrial applications exist implementing at least one piezoelectric, electrostrictive or magnetostrictive transducer (also called an actuator), which makes it possible to control a mechanical movement, such as a mechanical vibration, a displacement or a mechanical shock, using an electric or magnetic field.

More particularly, in the particular case of mechanical vibration generation, vibrating mechanical waves, and in particular ultrasonic waves, are used in a very large number of industrial fields, for example, and non-limitingly and non-exhaustively, cleaning, cutting, welding, etc.

Irrespective of the type of application, at least one piezoelectric, electrostrictive or magnetostrictive transducer is used, which is powered by an electric power generator, and which makes it possible to transform the electricity supplied by the generator into a mechanical movement.

In the particular case of a vibrational movement, the electricity supplied by the generator is transformed into a vibrating mechanical movement in a range of frequencies and amplitudes that in particular depends on the application. Many industrial applications use a vibrating mechanical movement controlled by a transducer operating in the ultrasound domain (frequencies typically exceeding 20 kHz). However, some applications may also use a transducer operating at frequencies below 20 kHz.

More particularly, in the vibrational field, the electric power generator delivers a power signal, the frequency and voltage of which can for example be adapted to the resonance or anti-resonance frequency of the transducer during operation in its environment. Most often, this power signal delivered by the generator is adjustable (for example in frequency and/or amplitude). Furthermore, in some known embodiments, this power signal delivered by the generator is controlled using external instructions and information (for example, current and voltage) measured on the transducer.

For many years, the control part was done in an analog manner, which required complex adjustments and made the control devices rigid and difficult to adapt. One control example of an ultrasonic transducer with analog control is for example described in American patent U.S. Pat. No. 5,406,503.

More recently, the use of digital control-based solutions has made it possible to incorporate new functionalities into the control of the operation of the transducer. Control examples of an ultrasonic transducer with digital control are for example described in the following publications: European patent applications EP-A-1 835 622, EP-A-1 216 760, EP-A-1 199 047 and EP-A-1 588 671.

It is remarkable to note that the described devices remain relatively rigid in their embodiment and are most often specific to a given application, i.e., a given type of piezoelectric, electrostrictive or magnetostrictive transducer.

Aim of the Invention

One aim of the invention is to propose a new technical solution for using a suitable electric power generator to control applications implementing at least one piezoelectric, electrostrictive or magnetostrictive transducer, that solution having the advantage of being universal, i.e., not specific to a single application, and being very flexible and easily adaptable to applications in different technical fields and to piezoelectric, electrostrictive or magnetostrictive transducers having different structures and mechanical properties. Another aim of the invention is to propose a control solution for a piezoelectric, electrostrictive or magnetostrictive transducer that is easy to upgrade, and that can be configured or modified quickly and easily.

BRIEF DESCRIPTION OF THE INVENTION

The invention thus relates to an electronic device for controlling applications using at least one piezoelectric, electrostrictive or magnetostrictive transducer, said device including an electric power generator suitable for powering at least one piezoelectric, electrostrictive or magnetostrictive transducer, with a control signal, electronic control means capable of automatically controlling the electric power generator by using a control macro-function (M), and an electronic memory in which are recorded:

- a first family (A) of control functions including one or more different elementary control functions (An), each elementary control function of the first family (A) making it possible to adjust the amplitude of the control signal,
- a second family (T) of control functions including one or more different elementary control functions (Tn), each elementary control function of the second family (T) making it possible to adjust the duration of the control signal,
- a third family (C) of control functions including several different elementary control functions (Cn), each elementary control function of the third family (C) making it possible to adjust the cycle of the control signal,
- at least said control macro-function (M), which is made up of the assembly of at least three elementary control functions respectively chosen from among the three families of control functions (A, T, C) recorded in the memory.

More particularly, but optionally according to the invention, the electronic device according to the invention may include the following additional and optional technical features, considered alone or in combination:

the electronic memory contains a fourth family (F) of control functions including one or more different elementary control functions (Fn), each elementary control function of the first family (F) making it possible to adjust the frequency of the control signal, and in which said control macro-function (M) is formed by the assembly of at least four elementary control functions respectively chosen from among the four families of control functions (A, T, C, F) recorded in the memory.

at least one elementary control function of said control macro-function (M) makes it possible to adjust the amplitude or duration or cycle or frequency of the control signal as a function of at least one adjustment value that is recorded in the electronic memory.

the electronic memory contains several different control macro-functions (Mn), which are each made up of the assembly of at least three elementary control functions respectively chosen from among the first, second and third families of control functions (A, T, C) recorded in the memory, and preferably by the assembly of at least four elementary control functions respectively chosen from among the first, second, third and fourth families of control functions (A, T, C, F) recorded in the memory.

the electronic memory contains the adjustment value(s) of the elementary control functions of a single control macro-function (M).

the electronic memory contains the adjustment value(s) of the predefined elementary control functions of each control macro-function recorded in the electronic memory.

The device includes at least one communication port making it possible to put the device in communication with the programmable electronic processing unit, of the microcomputer or programmable logic controller type.

The invention also relates to a system for controlling applications implementing at least one piezoelectric, electrostrictive or magnetostrictive transducer, said system including an aforementioned electronic device, and an electronic processing unit, which can be connected to said electronic device.

More particularly, but optionally according to the invention, the system according to the invention may include the following additional and optional technical features, considered alone or in combination:

the electronic processing unit makes it possible, when it is connected to the electronic device, to load at least one control macro-function (M) into the memory of the electronic device.

the electronic processing unit makes it possible, when it is connected to the electronic device, to load the elementary functions of each of the function families ((A, F, T) or (A, F, T, C)) into the memory of the electronic device.

the electronic processing unit makes it possible, when it is connected to the electronic device, to load the adjustment value(s) of at least one control macro-function (M) into the memory the electronic device.

the electronic processing unit, when it is connected to the electronic device, allows a user to select a control macro-function from among a set of control macro-functions (Mn) recorded in the memory of the device, the electric power generator of the device being designed to execute said selected control macro-function.

the electronic processing unit includes, in memory, at least all of the elementary control functions recorded in the electronic device, and a program for building macro-functions which, when executed by the electronic processing unit, allows a user to build a control macro-function (M) from said elementary control functions.

The invention also relates to a computer program comprising computer program coding means that can be executed by the electronic processing means (3), and making it possible, when it is executed by the electronic processing means (3), to build control macro-functions (M) from a first family (A) of control functions including one or more different elementary control functions (An), which each make it possible to adjust the amplitude of a control signal that must be generated by an electric power generator, a second family (T) of control functions including one or more different elementary control functions (Tn), which each make it possible to adjust the duration of said control signal, and a third family (C) of control functions including several different elementary control functions (Cn), which each make it possible to adjust the cycle of said control signal.

More particularly, but not necessarily, the computer program makes it possible to build control macro-functions (M) also from a fourth family (F) of control functions including one or more different elementary control functions (Fn), which each make it possible to adjust the frequency of said control signal.

The invention also relates to a computer program comprising computer program coding means that can be executed by the electronic processing means, and making it possible, when it is executed by the electronic processing means, to configure a control macro-function (M), wherein said control macro-function (M) comprises a first elementary control function (An), which makes it possible to adjust the amplitude of a control signal (S) that must be generated by the electric power generator, the adjustment preferably being done as a function of at least one adjustment value, a second elementary control function (Tn), which makes it possible to adjust the duration of said control signal (S), preferably as a function of at least one adjustment value, and a third elementary control function (Cn), which makes it possible to adjust the cycle of the control signal (S), preferably as a function of at least one adjustment value, said program allowing a user to define the adjustment value(s) of the elementary control function(s).

More particularly, but not necessarily, said computer configuration program makes it possible to configure a control macro-function (M) also comprising a fourth elementary control function (Fn), which makes it possible to adjust the frequency of said control signal, preferably as a function of at least one adjustment value.

The invention also relates to a medium that can be read by a computer and on which a computer program as described above is stored.

BRIEF DESCRIPTION OF THE FIGURES

Other features and advantages of the invention will appear more clearly upon reading the detailed description below of several alternative embodiments of the invention, those alternatives being described as non-limiting and non-exhaustive examples of the invention and in reference to the appended drawings, in which.

DETAILED DESCRIPTION OF THE INVENTION

Figure 1:
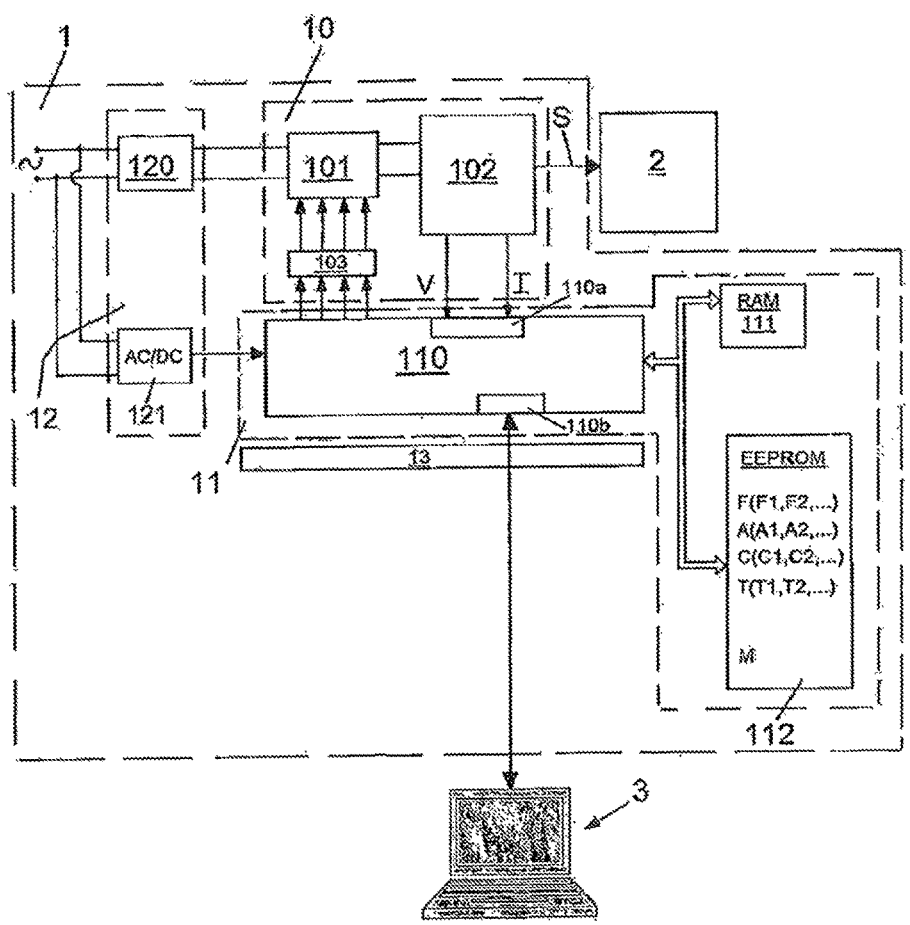
FIG. 1 is a block diagram illustrating the architecture of a control system according to the invention.

FIG. 1 shows one particular example of an electronic architecture of an electronic device 1 according to the invention, and which makes it possible to control a load 2 including at least one transducer (or actuator) which, depending on the case, may be of the piezoelectric, electrostrictive or magnetostrictive type.

In this text, the terms "piezoelectric or electrostrictive transducer" designate any device making it possible, in general, to transform electrical energy into mechanical energy through deformation of a material. In this text, "magnetostrictive transducer" designates any device generally making it possible to transform electromagnetic energy into mechanical energy through deformation of a material.

The load 2 and the associated piezoelectric, electrostrictive or magnetostrictive transducer(s) depend on the application and may be quite varied.

Example Applications

The electronic device 1 may be adapted and configured to control one or the other of the following loads 2, the list of which has been provided below solely as example applications of the invention, and are non-limiting and non-exhaustive with respect to the invention.

Cleaning

The electronic device 1 is connected to one or more transducers that are fastened on the outer wall of a vat, which in turn is filled with a cleaning liquid. The electrical energy provided by the electronic device 1 is transformed by the transducer(s) into a vibrational energy that causes a cavitation phenomenon in the vat. This cavitation produces cleaning of the submerged parts.

Several electronic devices 1 can be used to supply a large-volume cleaning vat. In that case, the generators of the electronic devices 1 are synchronized with each other.

Welding—Cutting—Sonochemistry

The electronic device 1 is connected to a transducer. This transducer is generally equipped with a booster and a sonotrode whereof the end geometry is determinate of the use and of its application.

To weld materials, the shape of the sonotrode must hug the shape of the surface to be welded, For cutting, the sonotrode assumes the form of a vibrating strip, For sonochemistry, mixing, the sonotrode is often, but not always, cylindrical, and it is directly submerged in the liquid to be treated, For aerosol production, the end surface of the sonotrode makes it possible to spray the liquid that comes into contact with it; that service may be flat, curved, etc., For defoaming, the end surface of the sonotrode makes it possible to produce a very intense acoustic field in a gas (>160 dB).

The electronic device 1 is connected to a transducer and is adjusted so as to keep its control frequency at the working frequency, which is often the resonance or anti-resonance frequency of the transducer and the associated sonotrode. The energy transmitted to the transducer is converted into a vibrational energy that causes the desired phenomenon:

1. For welding, heating,
2. For cutting, slicing of the material,
3. For sonochemistry, a very violent cavitation phenomenon,
4. For aerosol production, a dispersion of the liquid in droplets,
5. For defoaming, an acoustic field intense enough to break the foam bubbles during liquid filling in cans, etc.

Actuator Control

The electronic device 1 is connected to a transducer, which performs an actuator function, and the movement of which is proportional to a voltage delivered by the electronic device 1. This movement is for example a static displacement if the delivered voltage is continuous; it is for example impulsive if the delivered command is a pulse, or for example has a more general shape proportional to the signal produced by the electronic device.

The induced effect aims to control the movement of a mechanical device coupled to the actuator (transducer), to produce a very low frequency vibration or induce a propulsion shock.

Control of Linear or Rotary Piezoelectric/Magnetostrictive Motors

To produce a linear displacement device, it is necessary to create a progressive wave in a device with finite dimensions. The device may be a bar or a ring. The progressive wave is created by superimposing two stationary waves with a 90° phase shift over time, and a 90° phase spatial shift. To produce such a system, it is necessary to have at least two ultrasonic transducers correctly positioned on the bar. Two electronic devices 1 are necessary to achieve that aim. The first device 1 powers a transducer with a controlled phase, and the second device 1 powers the second transducer with a 90° phase shift synchronized on the first electronic device. One example of this type of application is described in the article: "A survey of Ultrasonic Waves in Outer Transportation", E. Murimi, J. Kihiu, G. Nyakoe and S. Mutuli.

The same principle is applicable to produce a rotary piezoelectric electric motor.

Architecture of the Electronic Control Device—FIG. 1

In reference to FIG. 1, the electronic device 1 includes an electric power generator 10, which, during operation, powers the load 2, with an electric power signal S, designated in this text as "control signal".

This electric power generator 10 is controlled automatically by a programmable electronic processing unit 11.

The electronic device 1 also includes an electric power supply 12, which includes:
a rectifying and filtering unit 120 making it possible to supply the electric power generator 10 with alternating current from the alternating current of the sector, and
a unit 121 for converting the alternating current from the sector into a direct current to supply direct current to the programmable electronic processing unit 11.

The electronic architecture of the electric power generator 10 is known in itself, and for example includes an H bridge 101 powering an adaptation network 102, which for example includes a transformer, and which delivers the aforementioned control signal S. The H bridge is controlled by the programmable electronic processing unit 11 in the standard manner using a driver 103. This particular electronic architecture of the electric power generator 10 is not limiting on the invention, and may be replaced by any electronic architecture making it possible to deliver an adjustable power signal (control signal S).

The programmable electronic processing unit 11 includes a digital processor 110 associated with a random-access memory (RAM) 111 and an electrically erasable read-only memory 112, of the EEPROM type. The digital processor 110 may for example be a microprocessor, a microcontroller or a processor specialized in signal processing of the DSP type.

In the example embodiment of FIG. 1, but optionally according to the invention, the digital processor 110 includes an input port 110a that is connected to the matching network 102, so as to perform real-time detection of the current I and the voltage V of the control signal S applied to the load 2. In some cases, this detection makes it possible to produce a feedback loop of the control signal S relative to one or more instructions using the digital processor 110.

In order to be able to communicate with the outside, the digital processor 110 also includes at least one communication port 110b, which may for example be a slow serial input/output port of the RS485 type or an Ethernet port.

The communication port 110b is in particular used to allow an external electronic processing unit 3, for example an automaton or computer, to dialogue with the digital processor 110, so as for example to allow the external electronic processing unit 3 to control the digital processor 110, or to load or conversely recover data in the read-only memory 112 or random-access memory 111.

The exchange of data with the outside on the communication port 110b is preferably done through galvanic isolation 13 for example including optocouplers, in the standard manner.

Control Macro-Function—Elementary Control Functions

The operation of the electronic device 1 is advantageously based on the implementation of one or more control macro-functions, also shortened in this text to "macros", which are each made up of elementary control functions, and which allow automatic adjustment by the processor 110 of the frequency, amplitude, duration and cycle of the control signal S.

Four families of elementary control functions are distinguished:

Frequency Family (F): This family includes all of the elementary control functions (F1, F2, F3, etc.) specific to the frequency of the control signal S, and outlined later. Each elementary control function from this family (F) makes it possible to adjust the frequency of the control signal, when it is executed automatically by the processor 110.

Amplitude Family (A): This family includes all of the elementary control functions (A1, A2, A3, etc.) specific to the amplitude of the control signal S, and outlined later. Each elementary control function from this family (A) makes it possible to adjust the amplitude of the control signal, when it is executed automatically by the processor 110.

Time Family (T): This family includes all of the elementary control functions (T1, T2, T3, etc.) specific to the notions of time (duration) of the generation of the control signal S, and outlined later. Each elementary control function from this family (T) makes it possible to adjust the duration of the control signal, when it is executed automatically by the processor 110.

Cycle Family (C): This family includes all of the elementary control functions (C1, C2, C3, etc.) specific to the notions of cycle for the generation of the control signal S and outlined later. Each elementary control function from this family (C) makes it possible to adjust the cycle of the control signal, when it is executed automatically by the processor 110.

In general, each elementary control function is characterized by one or more adjustment parameters (ArgN), which are more or less complex, are specific to each elementary function, and allow the configuration of each elementary control function of a control macro-function. These adjustment parameters are also referred to in the rest of this text as "arguments". For the operation of the electronic device 1, each argument (ArgN) of an elementary control function of a macro-function M must be filled in with one or more specific adjustment values for that argument.

All of the elementary control functions are initially stored in the read-only memory 112 of the device 1.

Different examples of elementary control functions will now be described non-limitingly and non-exhaustively with respect to the invention.

Examples of Elementary Control Functions in the Frequency Family (F)

F1: Forced Frequency

A frequency is imposed by the user, and the generator 10 applies that frequency with no feedback loop.

$$F1=f(Fc)$$

| Argument | Description | Unit | Precision |
|---|---|---|---|
| Fc | Frequency imposed on the system by the user | Hz | 2 |

F2: Phase-Regulated Frequency

An optimal resonance frequency is determined in the authorized frequency range. The regulation is done using a regulating loop as a function of the estimated phase shift between the voltage V and the current I.

$$F2=f(\text{Phase,initial frequency},F\text{final},Tn)$$

| Argument | Description | Unit | Precision |
|---|---|---|---|
| Phase | Phase setting to be followed [−180°; 180°] | Degree | 0.005 |
| initial frequency | Startup frequency of the regulation | Hz | 2 |
| Ffinal | Upper threshold frequency for frequency regulation | Hz | 2 |
| Tn | Number of phase measurements used to calculate the error (mean) |  | 1 |

Let us consider the example of the following function F2, where we seek to regulate the frequency on a phase zero:

$$F2=f(0,28000,29000,Tn)$$

Figure 2:
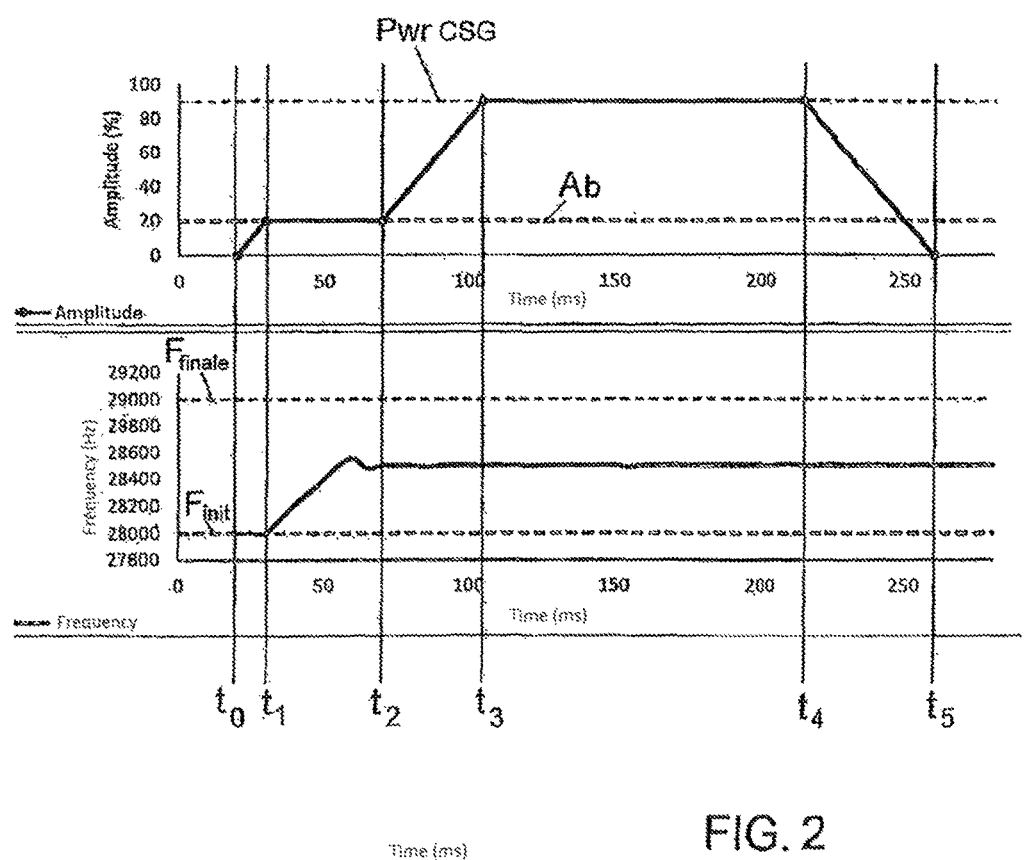
FIGS. 2 to 5 are graphs illustrating example embodiments of elementary control functions F2, F3, A2, C2, respectively.

When the system is started up, the behavior of the frequency and the amplitude of the control signal S are illustrated in FIG. 2.

F3: Modulated Frequency

A frequency variation dF is applied on a central frequency Fc. The modulation frequency is determined by Fm.

$$F3=f(Fc,dF,Fm)$$

| Argument | Description | Unit | Precision |
|---|---|---|---|
| Fc | Central frequency presumed to be optimal | Hz | 2 |
| dF | Frequency swing | Hz | 1 |
| Fm | Modulation frequency | Hz | 0.01 |

Let us consider the example of the following function F3:

$$F3=f(28000,1000,0.50)$$

Figure 3:
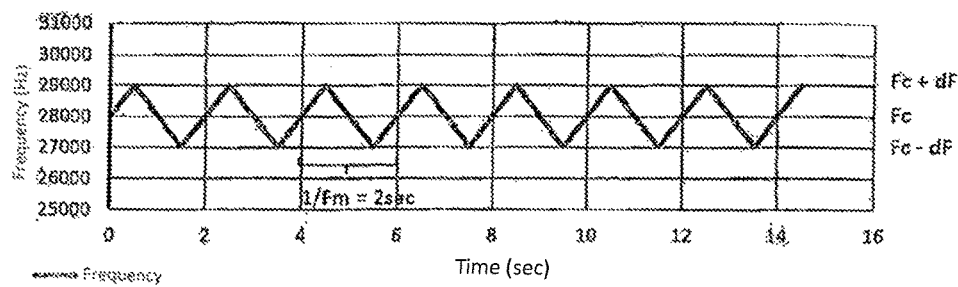

When the system is started up, the behavior of the frequency is illustrated in FIG. 3.

4: Random Frequency

A random frequency sequence is authorized according to random function.

$$Fexc = Fc \pm k\Delta f$$

The coefficient k is a random coefficient varying from 0 to 1. The sign of the function will also be random.

The function F4 will therefore be noted:

$$F4 = f(Fc, \Delta f)$$

| Argument | Description | Unit | Precision |
|---|---|---|---|
| Fc | Central frequency | Hz | 2 |
| Δf | Maximum swing around the setpoint frequency | Hz | 1 |

Examples of Elementary Control Functions from Amplitude Family (A)

A1: Forced Amplitude

An amplitude is imposed by the user; the generator 10 automatically applies that amplitude with no reaction.

$$A1 = f(Po)$$

| Argument | Description | Unit | Precision |
|---|---|---|---|
| Po | Imposed amplitude [0-100] | % | 1 |

A2: Power-Regulated Amplitude

The power setting is imposed by the user. The current I and voltage V measurement on the transducer make it possible to calculate the actual power provided by the generator. This power is compared to the setting to keep the setting stable irrespective of the disruptions the transducer may undergo.

$$A2 = f(Pcsg)$$

| Argument | Description | Unit | Precision |
|---|---|---|---|
| Pcsg | Power to be regulated [0-100] | % | 1 |

Let us consider the example of the following function A2:

$$A2 = f(80)$$

Figure 4:
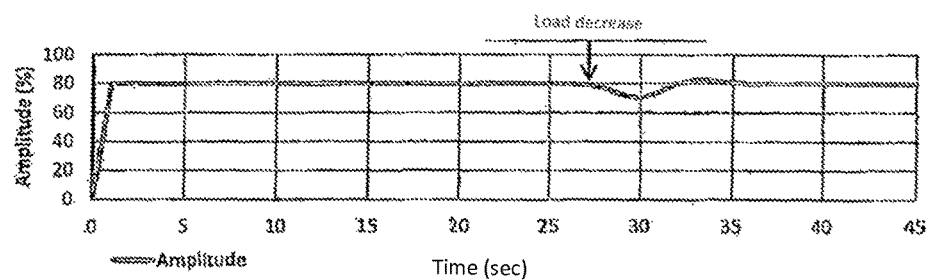

When the system is started up, the behavior of the power is illustrated in FIG. 4.

Example of Elementary Control Function from the Time Family (T)

T1: Time Elementary Function

The function T1 does not include any argument (adjustment value). When this function T1 is used in a macro-function, the control signal S is generated for an undetermined duration, until an external interruption of that signal is received by the generator 10.

T2: Operating Duration

This elementary function makes it possible to adjust the operating duration of the generation of the control signal S.

$$T2 = f(duration)$$

| Argument | Description | Unit | Precision |
|---|---|---|---|
| Duration | Operating duration before the automatic stop | sec | 1 |

A duration equal to zero indicates an infinite duration. In that case, the device 1 will only stop as of an external setting or command.

Examples of Elementary Control Functions from the Cycle Family (C)

C1: CYCLE Elementary Function

The function F1 does not include any argument (adjusted value). When this function C1 is used in a macro-function, the control signal S is non-cyclic, i.e., is generated without repetition of a cycle.

C2: Cyclic Ratio (Ton/Ttotal)

At the end of the operating time, a stop time is determined by the Ton/Ttotal cyclic ratio.

$$C2 = f(RC)$$

| Argument | Description | Unit | Precision |
|---|---|---|---|
| Rc | Cyclic ratio (Ton/Ttotal) | % | 1 |

Let us consider the example of the following associated functions:

$$F3 = f(28000, 1000, 0.50)$$

$$T2 = f(60)$$

$$C2 = f(30)$$

Figure 5:
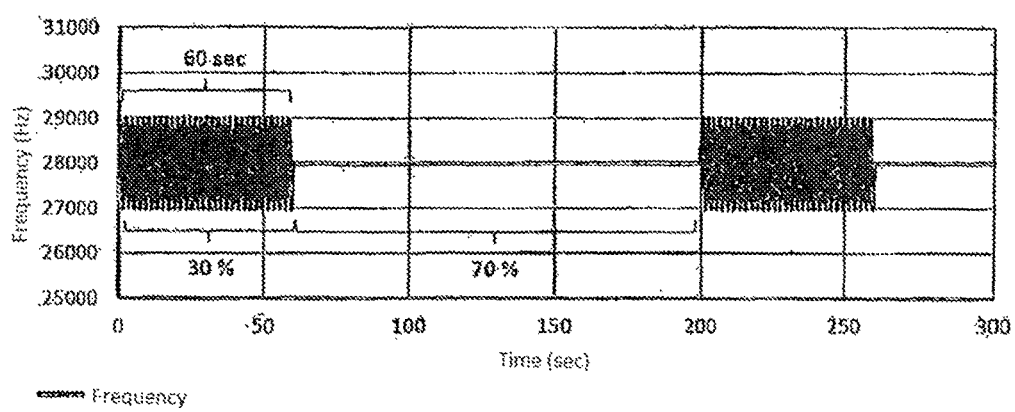

The behavior of the amplitude of the signal S is illustrated in FIG. 5.

Architecture and Depiction of a Control Macro-Function

Figure 6:
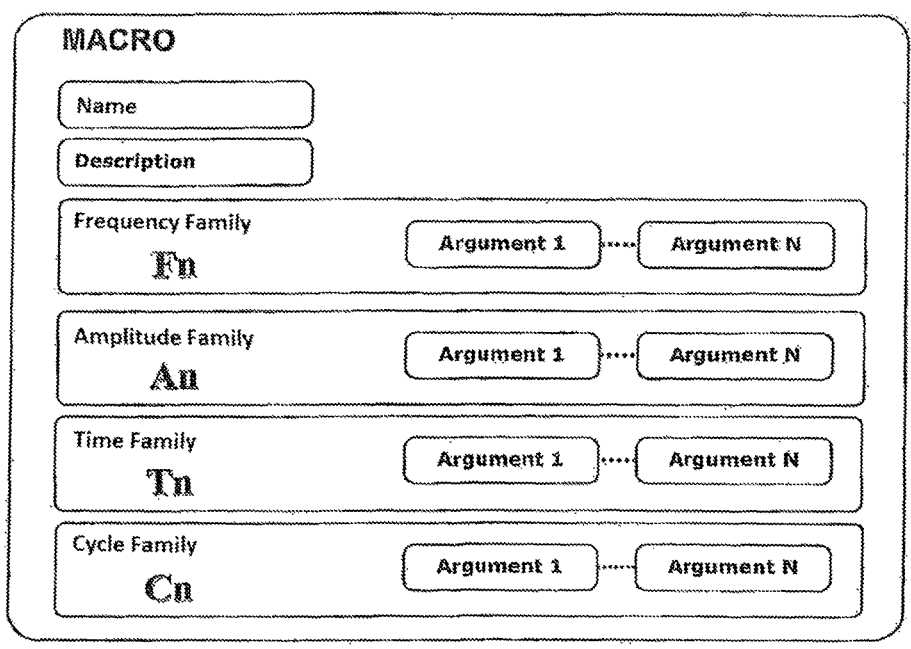
FIG. 6 illustrates an example implementation of a control macro-function.

FIG. 6 illustrates an example architecture of a control macro-function M, defined by the combination of different parameters:

Name: this is the identifier of the macro-function and must be unique and representative of the functionalities of the macro.

Description: This field is not essential, but makes it possible to provide the user with a quick and clear indication.

Frequency Family: Identification of the elementary function Fn of the family, among the functions specific to the family: F1, F2, F3, etc.

Amplitude family: Identification of the elementary function An of the family, among the functions specific to that family: A1, A2, A3, etc.

Time family: Identification of the elementary function Tn of the family, from among the functions specific to that family: T1, etc.

Cycle family: Identification of the elementary function Cn of the family, from among the functions specific to that family: C1, C2, C3, etc.

A control macro-function M can thus be written:

$$M = Fn(Arg1, Arg2, \ldots) + An(Arg1, Arg2, \ldots) + Tn(Arg1, Arg2, \ldots) + Cn(Arg1, Arg2, \ldots).$$

Example of Control Macro-Function

For example, in an industrial ultrasonic cleaning method, the user of the device 1 wishes to generate a wave train modulated at a fixed amplitude for a specific duration and to repeat that operation regularly.

During creation of the macro, it will therefore be necessary to assign that macro a name, a description, a Frequency function, an Amplitude function, a Time function and a Cycle function. Typically, the parameters of the macro are as follows:

| Parameters | Values |
| --- | --- |
| Name | SWEEP |
| Description | A frequency variation is authorized according to a frequency deviation parameter (dF) relative to the optimal central frequency. |
| Frequency Family | F3: Modulated frequency |
| Amplitude Family | A1: Forced amplitude |
| Time Family | T2: Operating duration |
| Cycle Family | C2: Cyclic ratio (Ton/Ttotal) |

The macro is created. However, it is unusable in that state. It is now necessary to define the arguments specific to each function:

| Functions | Arguments |
| --- | --- |
| F3: Modulated frequency | Fc : Central operating frequency<br>dF: Frequency variation<br>Fm: Frequency modulation |
| A1: Forced amplitude | Pcsg: Setpoint power |
| T2: Operating duration | Tcsg: Operating duration |
| C2: Cyclic ratio | RC: Ton/Ttotal |

We therefore obtain a macro that can be written:

SWEEP=$F3(Fc,dF,Fm) \oplus A1(Pcsg) \oplus T2(Tcsg) \oplus C2(RC)$

We therefore wish to use this macro at a central frequency of 30 kHz (±1000 Hz, modulated over 2 Hz) with an amplitude of 80% and over a duration of 10 minutes. Pause, then repeat the operation every forty minutes.

The macro will therefore be written:

SWEEP=$F3(30000,1000,2) \oplus A1(80) \oplus T2(600) \oplus C2(25)$

With:
F3(30000, 1000, 2) Corresponding to the modulated frequency
A1(80) Corresponding to an amplitude of 80%
T2(600) Corresponding to an operating duration of 10 minutes.
C2(25) Corresponding to a cyclic ratio of 25% (to obtain 40 minutes)
Configuration and Usage Principle for Control Macro-Function Initially, all of the available elementary control functions Fn, An, Tn, Cn are designed and loaded into the read-only memory 112 of the electronic device 1 by the manufacturer of the electronic device 1. This loading of the elementary control functions into the memory 112 may be done using a computer 3 or equivalent means connected to the communication port 110b of the device 1 (FIG. 1).

In one preferred alternative embodiment, the control macro-functions Mn are also designed by the manufacturer of the electronic device 1, and are for example stored on a server in a macro-function database.

To that end, the manufacturer of the electronic device 1 uses a specific computer program to build control macro-functions, which is suitable for being executed by electronic processing means, such as a microcomputer 3. This control macro-function building program makes it possible, when executed, for a user of the program to build control macro-functions (M) using elementary control functions from the aforementioned function families F, A, T, C.

In order to adapt the operation of the electronic control device 1 to the particular load 2 related to its specific application, the user of the electronic device 1 can, using a specific configuration program, which can be executed on a microcomputer 3 and has been provided to it by the manufacturer of the device 1:
  access the control macro-function database, either locally, or remotely via a telecommunications network, of the Internet type, and
  configure one or more control macro-functions to which it has access. Configuring the control macro-function consists of setting the adjustment value(s) of the arguments ArgN specific to each elementary control function making up the control macro-function.

Once the configuration step is complete, each control macro-function Mn that has been configured is stored locally in a backup file, for example on the hard drive of the user's microcomputer, while being allocated to a given electronic device 1. The backup file contains the elementary functions allocated to the macro as well as all of the arguments filled in by the user.

Next, the user connects his microcomputer to the communication port 110b of the device 1 and loads the control macro-function(s) that have been configured into the read-only memory 112 of the device 1. During this step, the arguments ArgN of the elementary functions are not transferred.

More particularly, in the read-only memory 112, an area dedicated to the macros exists, like that shown below:

| @ | Name | Comments | Min | Max |
| --- | --- | --- | --- | --- |
| 0x0514 | No. of macros configured | | 0 | 31 |
| 0x0515 | No. of active macros | 0: No active macros | 0 | 31 |
| 0x0516 | Macro 1 (Fn and An) | Bits 0 to 7: Frequency function no. | 1 | 255 |
| | | Bits 8 to 15: Amplitude function no. | 1 | 255 |
| 0x0517 | Marco 1 (Tn and Cn) | Bits 0 to 7: Time function no. | 1 | 255 |
| | | Bits 0 to 7: Cycle function no. | 1 | 255 |
| ... | | | | |
| 0x0552 | Marco 31 (Fn and An) | Bits 0 to 7: Frequency function no. | 1 | 255 |
| | | Bits 8 to 15: Amplitude function no. | 1 | 255 |
| 0x0553 | Marco 31 (Tn and Cn) | Bits 0 to 7: Time function no. | 1 | 255 |
| | | Bits 8 to 15: Cycle function no. | 1 | 255 |

The electronic device 1 can thus contain, in read-only memory 112, one or more configured control macro-functions M1, M2, . . . , Mn.

Next, to make the electronic device operate, several scenarios may occur.

In a first autonomous operating mode, the user's microcomputer 3 being connected to the communication port 110b, the user views the control macro-function(s) stored in random access memory 111 on the screen of his microcomputer, activates only one macro-function M from among the set of available macro-functions, and transfers the arguments (Arg1, . . . ) of the elementary functions of the control macro-function that are stored in the backup file on the hard drive of the microcomputer into the read-only memory 112 of the electronic device 1.

As an example, let us consider the following macro:

SWEEP=$F3(28000,1000,0.50) \oplus A1(80) \oplus T1(600) \oplus C2(25)$

During the transfer of the macro to the electronics, the EEPROM 112 of the peripheral will have the following information:

| | Frequency | Amplitude | Time | Cycle |
|---|---|---|---|---|
| Number of usable macros 1 | | | | |
| Number of the active macro 1 | | | | |
| MACRO 1 | 3 | 1 | 1 | 2 |
| MACRO 2 | 0 | 0 | 0 | 0 |
| ... | 0 | 0 | 0 | 0 |
| MACRO 31 | 0 | 0 | 0 | 0 |

Once the control macro-function M is activated, the electronic control device 1 can operate autonomously, the processor 110 being programmed to control the H bridge 101 of the generator 10 from the active control macro-function M.

In another controlled operating mode, a programmable automaton or equivalent means is connected to the communication port 110b of the electronic device 1 and automatically controls the device 1 by automatically activating a control macro-function at the same time as a function of a program executed by the automaton.

In the aforementioned example embodiments, the macro-functions are built from four families (F, A, T, C) of elementary control functions. In another alternative embodiment, in particular when the transducer does not generate a vibrational movement, but is used for example to control the movement of a member or to generate a mechanical impact, the Frequency family F is not essential, and the macro-functions may be built from three families (A, T, C).

In the context of the invention, the arguments $Arg_1$, $Arg_2$, . . . , of one or more control functions are not necessarily constant over time, but can also make up variables that evolve over time as a function of a programmed control law, in particular being able to take into account the evolution of the system that is controlled by the electronic control device into account.

This design in the form of control macro-functions made up of configurable elementary functions allows the user of the electronic device 1 to develop and hone a given application quickly and easily, by configuring the universal electronic device 1 so as to adapt specifically to the piezoelectric, electrostrictive or magnetostrictive transducer of the application. This new design also allows the manufacturer of the electronic device 1 to configure and upgrade the device 1 easily, by loading new elementary control functions into the memory 112 and/or by modifying the existing elementary control functions.

The invention claimed is:

1. An electronic device for controlling applications using at least one piezoelectric, electrostrictive or magnetostrictive transducer, said device including an electric power generator suitable for powering at least one piezoelectric, electrostrictive or magnetostrictive transducer, with a control signal, electronic control means capable of automatically controlling the electric power generator by using a control macro-function, and an electronic memory in which are recorded:
   a first family of control functions including one or more different elementary control functions, each elementary control function of the first family making it possible to adjust the amplitude of the control signal,
   a second family of control functions including one or more different elementary control functions, each elementary control function of the second family making it possible to adjust the duration of the control signal,
   a third family of control functions including several different elementary control functions, each elementary control function of the third family making it possible to adjust the cycle of the control signal,
   at least said control macro-function, which is made up of the assembly of at least three elementary control functions respectively chosen from among the three families of control functions recorded in the memory,
   wherein the electronic control means controls the electric power generator using the control macro-function to power at least one piezoelectric, electrostrictive or magnetostrictive transducer.

2. The device according to claim 1, wherein the electronic memory contains a fourth family of control functions including one or more different elementary control functions, each elementary control function of the fourth family making it possible to adjust the frequency of the control signal, and in which said control macro-function is formed by the assembly of at least four elementary control functions respectively chosen from among the four families of control functions recorded in the memory.

3. The device according claim 1, wherein at least one elementary control function of said control macro-function makes it possible to adjust the amplitude or duration or cycle or frequency of the control signal as a function of at least one adjustment value that is recorded in the electronic memory.

4. The device according to claim 3, wherein the electronic memory contains the adjustment value of the elementary control functions of a single control macro-function.

5. The device according to claim 3, wherein the electronic memory contains the adjustment value of the predefined elementary control functions of each control macro-function recorded in the electronic memory.

6. The device according claim 1, wherein the electronic memory contains several different control macro-functions, which are each made up of the assembly of at least three elementary control functions respectively chosen from among the first, second and third families of control functions recorded in the memory, and preferably by the assembly of at least four elementary control functions respectively chosen from among the first, second, third and fourth families of control functions recorded in the memory.

7. The device according claim 1, including at least one communication port making it possible to put the device in communication with the programmable electronic processing unit, of the microcomputer or programmable logic controller type.

8. A system for controlling applications implementing at least one piezoelectric, electrostrictive or magnetostrictive transducer, said system including an electronic device according to claim 1, and an electronic processing unit, which can be connected to said electronic device.

9. The system according to claim 8, wherein the electronic processing unit makes it possible, when it is connected to the electronic device, to load at least one control macro-function into the memory of the electronic device.

10. The system according to claim 8, wherein the electronic processing makes it possible, when it is connected to the electronic device, to load the elementary functions of each of the function families or into the memory of the electronic device.

11. The system according claim 8, wherein the electronic processing unit makes it possible, when it is connected to the electronic device, to load the adjustment value of at least one control macro-function into the memory of the electronic device.

12. The system according claim 8, wherein the electronic processing unit, when it is connected to the electronic device, allows a user to select a control macro-function from among a set of control macro-functions recorded in the memory of the device, the electric power generator of the device being designed to execute said selected control macro-function.

13. The system according to claim 8, wherein the electronic processing unit includes, in memory, at least all of the elementary control functions recorded in the electronic device, and a program for building macro-functions which, when executed by the electronic processing unit, allows a user to build a control macro-function from said elementary control functions.

14. A computer program comprising computer program code tangibly fixed in a non-transitory storage medium, when executed by an electronic processing means the program code constructs macro-functions control from a first family of control functions having one or a plurality of different elementary control functions, each making it possible to adjust the amplitude of a signal to be generated by an electric power generator, a second family of control functions having one or a plurality of different elementary control functions, each making it possible to adjust the duration of said control signal, and a third family of control functions having several different elementary control functions, each making it possible to adjust the cycle of said control signal;

wherein the electronic control means controls the electric power generator using the control macro-function to power at least one piezoelectric, electrostrictive or magnetostrictive transducer.

15. The computer program according to claim 14, wherein when executed by the electronic processing means the program code builds control macro-functions also from a fourth family of control functions having one or a plurality of different elementary control functions, each making it possible to adjust the frequency of said control signal.

16. A support system that is readable by a computer and on which is recorded a computer program according to claim 14.

17. A computer program comprising computer program code tangibly fixed in a non-transitory storage medium, when executed by an electronic processing means the program code sets a control macro-function, said control macro-function comprising a first elementary control function, which makes it possible to adjust, preferably based on at least one setting value, the amplitude of a control signal to be generated by an electric power generator, a second function of elementary command, which makes it possible to adjust the duration of said control signal, preferably based on at least one setting value, and a third elementary control function, which makes it possible to adjust the cycle of the control signal, preferably based on at least one setting value, said program allowing a user to define the setting value or values of the elementary control function or functions;

wherein the electronic control means controls the electronic power generator using the control macro-function to power at least one piezoelectric, electrostrictive or magnetostrictive transducer.

18. The computer program according to claim 17, wherein when executed by the electronic processing means the program code sets a control macro-function also comprising a fourth elementary control function, making it possible to adjust the frequency of said control signal, preferably based on at least one setting value.

* * * * *